(12) United States Patent
Wogulis et al.

(10) Patent No.: US 8,606,907 B1
(45) Date of Patent: Dec. 10, 2013

(54) MULTI-TIERED SYSTEM FOR RECEIVING AND REPORTING WEB SITE TRAFFIC DATA

(75) Inventors: James Lee Wogulis, Laguna Beach, CA (US); Mayur Venktesh Deshpande, Long Beach, CA (US); Jacob Burton Matthews, Chicago, IL (US); Kasem Marifet, Costa Mesa, CA (US)

(73) Assignee: Google Inc., Mountain View, CA (US)

( * ) Notice: Subject to any disclaimer, the term of this patent is extended or adjusted under 35 U.S.C. 154(b) by 106 days.

(21) Appl. No.: 13/187,452

(22) Filed: Jul. 20, 2011

(51) Int. Cl.
 *G06F 15/173* (2006.01)
(52) U.S. Cl.
 USPC ............ 709/224; 709/223; 709/238; 709/242
(58) Field of Classification Search
 None
 See application file for complete search history.

(56) References Cited

U.S. PATENT DOCUMENTS

| | | | |
|---|---|---|---|
| 5,301,290 A | 4/1994 | Tetzlaff et al. | |
| 5,414,839 A | 5/1995 | Joshi | |
| 5,550,981 A | 8/1996 | Bauer et al. | |
| 5,890,159 A | 3/1999 | Sealby et al. | |
| 6,108,654 A | 8/2000 | Chan et al. | |
| 6,144,983 A | 11/2000 | Klots et al. | |
| 6,362,836 B1 | 3/2002 | Shaw et al. | |
| 6,460,067 B1 | 10/2002 | Chaudhry et al. | |
| 6,606,626 B1 | 8/2003 | Ponnekanti | |
| 6,950,848 B1 | 9/2005 | Yousefi'zadeh | |
| 7,085,682 B1 | 8/2006 | Heller et al. | |
| 7,363,387 B1 * | 4/2008 | Chandra et al. | 709/242 |
| 7,636,677 B1 | 12/2009 | McGonigal et al. | |
| 7,768,919 B1 | 8/2010 | Conway | |
| 7,792,954 B2 * | 9/2010 | Hanson et al. | 709/224 |
| 8,060,880 B2 | 11/2011 | Cherem et al. | |
| 8,307,101 B1 | 11/2012 | Mui et al. | |
| 8,321,443 B2 | 11/2012 | Andrade et al. | |
| 2002/0042821 A1 | 4/2002 | Muret et al. | |
| 2003/0028631 A1 | 2/2003 | Rhodes | |
| 2003/0105756 A1 | 6/2003 | Daynes | |
| 2003/0107994 A1 | 6/2003 | Jacobs et al. | |
| 2004/0008896 A1 | 1/2004 | Suzuki | |
| 2004/0148375 A1 * | 7/2004 | Levett et al. | 709/223 |
| 2005/0198273 A1 | 9/2005 | Childress et al. | |
| 2006/0168099 A1 | 7/2006 | Diamant | |

(Continued)

OTHER PUBLICATIONS

"The Web Doesn't Wait—Neither Should You," Chartbeat—Real-Time Website Analytics and Uptime Monitoring, http://chartbeat.com/.

(Continued)

*Primary Examiner* — Jason K. Gee
*Assistant Examiner* — Henry Tsang
(74) *Attorney, Agent, or Firm* — John D. Lanza; Foley & Lardner LLP (57) ABSTRACT

Configurations of a multi-tiered system for receiving and reporting web site traffic data with low latency are described. The multi-tiered system can include a tier of collecting servers for receiving incoming event tracking data communications (e.g., HTTP requests for logging web page requests at corresponding web sites). A collecting server receiving an incoming communication determines a particular logging server in a lower tier to route the incoming communication. Upon receiving the incoming communication, the logging server processes the communication by 1) logging the communication to persistent storage, and 2) routing the communication to i) a tier of long-term storage servers and ii) a tier of short term storage and low-latency servers (i.e., real-time servers) for aggregating and reporting web site traffic data. Each real-time server can be configured to aggregate the web site tracking data for reporting to a publisher with low latency.

22 Claims, 6 Drawing Sheets

(56) References Cited

U.S. PATENT DOCUMENTS

| | | | |
|---|---|---|---|
| 2006/0274761 A1 | 12/2006 | Error et al. | |
| 2007/0033372 A1 | 2/2007 | Everhart et al. | |
| 2007/0157157 A1 | 7/2007 | Dentzer et al. | |
| 2008/0040473 A1 | 2/2008 | Larsson et al. | |
| 2008/0114875 A1 | 5/2008 | Anastas et al. | |
| 2009/0161594 A1 | 6/2009 | Zhu et al. | |
| 2010/0075707 A1* | 3/2010 | Fritsch et al. | 455/517 |
| 2010/0146110 A1 | 6/2010 | Christensen et al. | |
| 2010/0169894 A1 | 7/2010 | Sheaffer et al. | |
| 2010/0223244 A1 | 9/2010 | Sinha et al. | |
| 2010/0318527 A1 | 12/2010 | Nandy et al. | |
| 2010/0332531 A1 | 12/2010 | Galande | |
| 2011/0029581 A1 | 2/2011 | Zhao et al. | |
| 2011/0107241 A1* | 5/2011 | Moore | 715/760 |
| 2011/0131316 A1 | 6/2011 | Ferris et al. | |
| 2011/0283045 A1 | 11/2011 | Krishnan et al. | |
| 2012/0311153 A1 | 12/2012 | Morgan | |
| 2012/0331229 A1 | 12/2012 | Sabir | |

OTHER PUBLICATIONS

"Adobe SiteCatalyst—Actionable Web Analytics," Online Analytics—Web Analytics—SiteCatalyst—Online Optimization by Omniture, http://www.omniture.com/en/products/online_analytics/sitecatalyst.

"Your Dots, Connected," Webtrends, Analytics, http://www.webtrends.com/Products/Analytics.

"Real Time Web Analytics," Web Analytics in Real Time—Clicky, http://getclicky.com/.

"Features Overview," Features Overview—Woopra, http://www.woopra.com/features/.

A. Himel, "Building Realtime Insights," Building Realtime Insights—Facebook, Mar. 15, 2011, https://www.facebook.com/note.php?note_id=10150103900258920.

"Interaction Manager Overview," Toovio—Real-Time Marketing, Simplified, http://www.toovio.com/Interaction-Manager-Overview.

"Real-Time Event Tracking. Measure Actions, Not Page Views." Mixpanel—Real-Time Web Analytics, Funnel Analysis, http://mixpanel.com/.

* cited by examiner

MULTI-TIERED SYSTEM FOR RECEIVING AND REPORTING WEB SITE TRAFFIC DATA

BACKGROUND

Web site analytics involves the analysis and reporting of web site traffic data to an associated publisher. A publisher is an entity that owns and/or manages a particular web site. The publisher can monitor web site analytics data related to user visits and links to the web site by using web site analytics tools provided by third parties.

Existing web site analytics data systems work well for processing a high volume of web traffic data in order to provide interactive reports over substantial periods of time with high fidelity. However, these systems incur a high level of latency from hit occurrence to hit reporting; and also do not allow reports to segment in a fine and granular time basis. Consequently, existing web site analytics data systems have difficulty in monitoring sudden spikes or drops in traffic, or for tracking, for example, a propagation of a link to the publisher's web site over a social networking site, which can typically unfold in a time period of minutes.

Furthermore, the high latency of web site analytics reporting makes it more difficult for publishers to implement web site analytics on their web sites. Because it takes a longer period of time for reports to show up, publishers also often fail to notice any erroneous deployment of web site analytics tracking code on associated web sites.

SUMMARY

The subject technology provides a multi-tiered system including a collecting server configured to receive and forward an event tracking data communication. The event tracking data communication includes event tracking data for tracking an activity associated with a source of the event tracking data communication. The system also includes a logging server configured to receive and forward an event tracking data communication from the collecting server, and a real-time server. The system includes a real-time server configured to receive one or more event tracking data communications for temporary storage. The logging server is further configured to route the received event tracking data communication to both a long-term storage server for persistent storage and the real-time server for temporary storage. The real time server is further configured to aggregate the event tracking data for reporting to a publisher with low latency.

One aspect of the subject technology provides for receiving an event tracking data communication and routing the event tracking data communication to a long-term storage server for persistent storage. The event tracking data communication includes event tracking data for tracking an activity associated with a source of the event tracking data communication. A real-time server is selected for routing the event tracking data communication. The event tracking data communication is then routed to the selected real-time server for temporary storage.

Another aspect of the subject technology provides for receiving an event tracking data communication. The event tracking data communication includes event tracking data for tracking an activity associated with a source of the event tracking data communication. At least one real-time server is then determined as being associated with the received event tracking data communication. Real-time analytics data is stored based on the received event tracking data communication in response to the real-time server being associated with the received event tracking data communication.

The subject technology further provides for receiving one or more event tracking data communications. Each event tracking data communication includes event tracking data for tracking an activity associated with a source of the event tracking data communication. The one or more event tracking data communications are routed to a long-term storage server for persistent storage in which the one or more event tracking data communications are stored in non-volatile storage on the long-term storage server. A real-time server is selected among several real-time servers for routing the one or more event tracking data communications in which the real-time server is arbitrarily selected. The one or more event tracking data communications are then routed to the selected real-time server for temporary storage.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Current analytics systems provide for aggregating and reporting of web site traffic data. However, current analytics systems have high latency in aggregating and reporting web site traffic data, typically in the magnitude of at least several hours or an entire day. To address issues with high latency, the subject technology is directed to a multi-tiered system for receiving and reporting web site traffic data with low latency in a substantially real-time manner.

The multi-tiered system can include a tier of collecting servers for receiving incoming event tracking data communications (e.g., HTTP requests for logging web page requests at corresponding web sites). A collecting server receiving an incoming communication determines a particular logging server in a lower tier to route the incoming communication. Upon receiving the incoming communication, the logging server processes the communication by routing the communication to 1) a tier of long-term storage servers for persistent storage and 2) a tier of short term storage and low-latency servers (i.e., real-time servers) for aggregating and reporting web site traffic data with low latency in a substantially real-time manner. Additionally, some implementations provide a front-end tier for receiving aggregated web site tracking data processed by the tier of real-time servers. The front-end tier can include various clients that present/display the aggregated web site tracking data with low latency to a respective publisher of a web site.

To use a web site analytics data system, a publisher typically provides tracking instructions embedded in the web site's web pages (alternatively or conjunctively, by providing code in its web page that requests the tracking instructions from an analytics server). Typically, the tracking instructions are a small region of JavaScript™ code that the publisher includes in each page of the publisher's web site for which traffic is to be tracked. When a web page is rendered by a user device and/or client (e.g., web browsers, mobile devices, tablet devices, thin clients, thick clients, etc.), the tracking instructions are executed, which collects visitor data and sends it back to a real-time analytics server in the form of an event tracking data communication for processing. One method of sending the event tracking data communication is to send it as part of a Hypertext Transfer Protocol (HTTP) request.

Web site traffic data can be in the form of the aforementioned event tracking data communications (e.g., Hypertext Transfer Protocol (HTTP) requests that are generated from various user devices and/or clients). Each event tracking data communication can be triggered upon loading of a web page or resource (e.g., image file, banner ad, audio file, etc.) on the web site by a particular visitor to a publisher's web site. For the purpose of web site analytics reporting, the associated web site tracking data (e.g., included in associated HTTP requests) can include a web property ID (e.g., an account identifier that identifies a publisher's analytics account of a particular web site), visitor identity data (i.e., corresponding to a particular user session), an event statistic(s) (such as a timestamp of the current web page communication), and user data such as location data (i.e., geographical information) associated with the visitor to the publisher's web site. The amount and types of events/information that are reported in the tracking data can be specified by the publisher (e.g., to account for particular information that a publisher wishes to track as web site analytics data).

Although an event tracking data communication is described as including web site traffic data, an event tracking data communication is not limited to including web site traffic data. In particular, an event tracking data communication can include data from any source (e.g., application, platform, etc.) that is utilized for tracking an activity associated with the source. For example, in a mobile application platform, an event tracking data communication can include event tracking data that tracks an event associated with an activity within the mobile application platform. In this example, the event tracking data associated with the mobile application platform may not include web site traffic data because the mobile application platform does not require the use of a client such as a web browser. Aspects of the multi-tiered real-time analytics system therefore can be configured to receive and process an event tracking data communication(s) including different forms of event tracking data that are outside the scope of web site tracking data.

Figure 1:
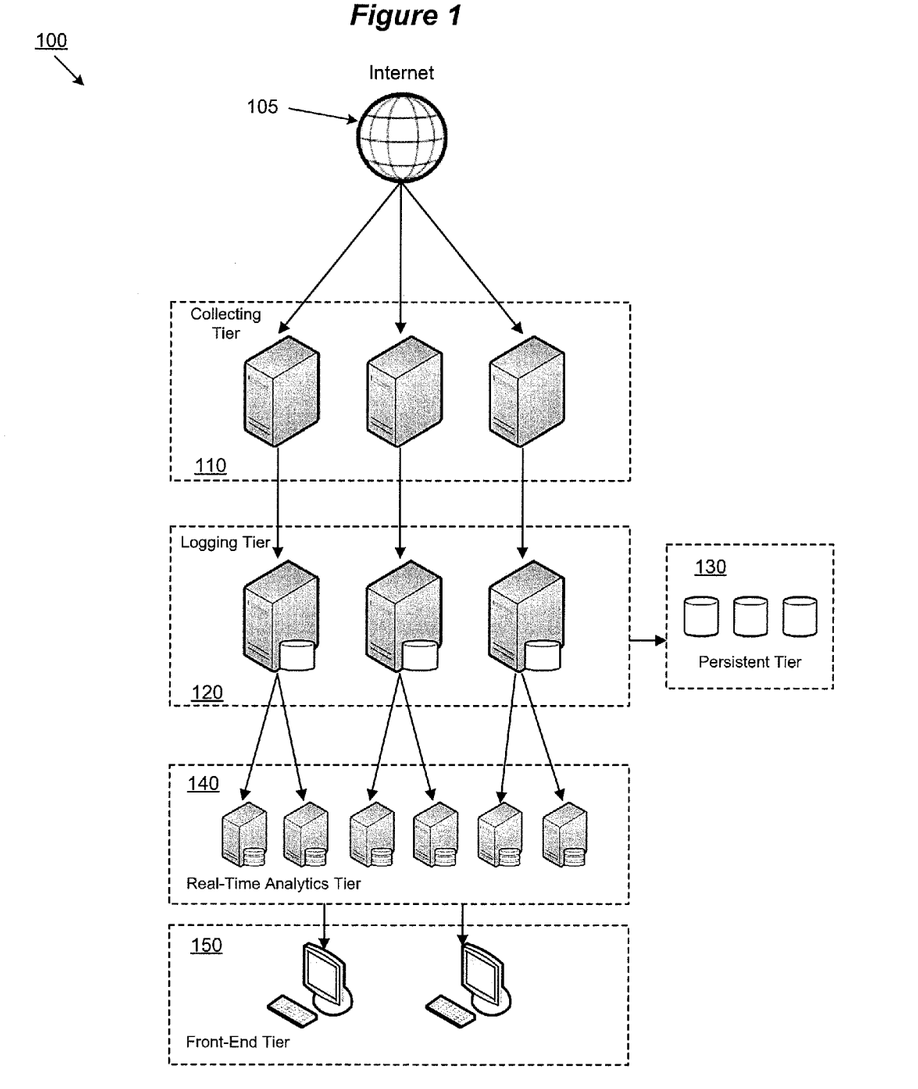
FIG. 1 illustrates an exemplary architecture diagram of a multi-tiered real-time analytics system of some configurations.

A multi-tiered real-time analytics system as described herein can be configured to receive and process incoming event tracking data communications as described above to enable real-time reporting of web site analytics data with low latency. As used herein and discussed in further detail below, the term "real-time" corresponds with reporting web site analytics data within a specified deadline by pushing/transmitting the web site analytics data through different tiers of the multi-tiered real-time analytics system. The expression "low latency" as used herein can be therefore understood as a measurement of time that covers a time period from the reception of an event tracking data communication to the real-time reporting of the web site analytics data included therein. As illustrated in FIG. 1 and described in further detail below, the flow of event tracking data goes through several tiers for real-time web site analytics processing and reporting according to deadlines in a real-time system.

A real-time system is subject to a "real-time constraint" that can impose operational deadlines from an event to a system response. Thus, a real-time system operates within constraints on response time. In the context of the multi-tiered real-time analytics system, the flow of event tracking data through different tiers of the system is required to meet deadlines in order to report the data within a specified period of time (e.g., in a real-time manner with low latency). In one example, the real-time analytics system imposes a respective one second deadline for processing event tracking data within each tier of the system. For instance, upon receipt of an event tracking data communication, a logging server (e.g., in a logging tier described further below) must forward the event tracking data communication within a one second deadline to a real-time server (e.g., in a real-time analytics tier described below). In the event that the logging server can not meet the one second deadline, the event tracking data communication is dropped (e.g., discarded) by the logging server and no further processing occurs for that event tracking data communication. Similarly, when the real-time server receives the event tracking data communication from the logging server, the real-time server must forward the event tracking data communication to another real-time server or a front-end server (as described below) within a one second deadline. The real-time server similarly discards the event tracking data communication if it can not meet the one second deadline. The one second deadline discussed above is just one example of the specified period of time. Other periods of time may be specified. In addition, each tier of the real-time analytics system may have a different specified period of time for processing an event tracking data communication.

FIG. 1 illustrates an exemplary architecture diagram of a multi-tiered real-time analytics system 100 for receiving and reporting web site traffic data in the form of event tracking data communications. The multi-tiered real-time analytics system 100 receives such event tracking data communications from a network 105 and routes the received communications for persistent and temporary storage to enable web analytics processing by the system. The network 105 can include, but is not limited to, a local network, remote network, or an interconnected network of networks (e.g., Internet as shown in FIG. 1).

As illustrated, the multi-tiered real-time analytics system 100 may further include a collecting tier 110, a logging tier 120, a persistent tier 130, a real-time analytics tier 140 and a front-end tier 150. Each of the aforementioned tiers can include a respective cluster of servers/computers that perform a same set of functions in a distributed and/or load balanced manner. A cluster can be understood as a group of servers/computers that are linked together to seamlessly perform the same set of functions, which can provide performance, reliability and availability advantages over a single server/computer architecture. For the sake of simplicity, each illustrated tier depicts several number of servers. However, one of ordinary skill in the art would realize that the illustrated tiers could include any number of servers and still be within the scope of the subject technology. The descriptions of the various tiers of the system 100 are explained in further detail below.

In some configurations, the collecting tier 110 receives incoming event tracking data communications from the network 105. The collecting tier 110 includes at least one collecting server that is configured to receive and forward the event tracking data communication. Each collecting server of the collecting tier 110 can process an incoming event tracking data communication to determine a particular server in the logging tier 120 to route the event tracking data communication. In some implementations, the collecting server can utilize a load balancing technique to determine which logging server in the logging tier 120 to route the event tracking data communication. The load balancing technique can be based upon different factors such as server load, network load, and/or any other suitable computing metric for measuring resource utilization at a particular server.

The logging tier 120 can receive a routed event tracking data communication from a particular collecting server of the collecting tier 110. Upon receiving the event tracking data communication, the subsequent tasks of the logging tier 120 can be understood as being two-fold: 1) route received event tracking data communications to the persistent tier 130 for persistent storage and 2) route received event tracking data communication to the real-time analytics tier 140 for temporary storage.

To accomplish the aforementioned tasks, the logging tier 120 includes at least one logging server that is configured to receive the routed event tracking data communication from the collecting server. In some implementations, the logging server aggregates incoming event tracking data communications and then periodically routes the aggregated event tracking data communications to the persistent tier 130 for persistent storage. Each event tracking data communication is associated with a particular web site of a publisher and the aggregated event tracking data communications can originate from disparate associated web sites and/or the same web site. In some implementations, the logging server can be further configured to verify each routed event tracking data communication to guarantee delivery of the event tracking data communications to a particular long-term storage server in the persistent tier 130.

For persistent storage of the event tracking data communication, the persistent tier 130 of some configurations can include at least one long-term storage server. Each long-term storage server includes a non-volatile storage device(s), a database(s), or other similar non-volatile storage medium for persistent storage of an incoming event tracking data communication. Persistent storage as used herein can be understood as referring to a type of non-volatile storage that stores the event tracking data in a reliable manner. In some configurations, persistent storage can include lossless or near-lossless storage in which the data is stored without being deleted and/or replaced at a subsequent time period. Additionally, persistent storage can be characterized as storing event tracking data in a form of historical records so that the system can extract the stored tracking data at a later period of time. In some configurations, the stored event tracking data can be modified at a later time period. Alternatively, the stored event tracking data can be in the form of immutable records (i.e., data that is not modified after being stored).

To improve the reliability of the persistent storage, some implementations of the persistent tier 130 can replicate the stored event tracking data across another long-term storage server so that the tracking data is mirrored in at least one other long-term storage server. For instance, the long-term storage server that receives a particular event tracking data communication can then undergo a replication process (either initiated by the long-term storage server itself, a second long-term storage server, or another server in the multi-tiered system) to copy (i.e., replicate) the particular event tracking data to another long-term storage server. Data redundancy can therefore can be provided to enable fault tolerance in the event the data stored at one long-term storage server is corrupted and/or lost.

To meet the low latency requirements for a multi-tiered real-time analytics system, the system can employ a lossy scheme for reporting web site traffic data in which some loss of event tracking data is tolerated. In particular, because the event tracking data is stored in persistent storage as described above, the multi-tiered real-time analytics system can adopt certain trade-offs for the sake of minimizing latency when routing the event tracking data to the real-time analytics tier as described further below.

Each logging server of the logging tier 120 is further configured to route event tracking data communications to the real-time analytics tier 140 for temporary storage. Given the requirement of low latency (i.e., minimizing latency in the system) connected with reporting real-time analytics data, each logging server can be configured to route the event tracking data communications to the real-time analytics tier 140 at a greater frequency than routing the communications to the persistent tier 130. In some implementations, routing the tracking data communications to the real-time analytics tier 140 can be understood as occurring asynchronously with routing the communications to the persistent tier 130.

The real-time analytics tier 140 includes at least one real-time server that is configured to receive the routed event tracking data communication from the logging tier 120. The real-time server in some implementations is configured to aggregate and/or sort the event tracking data according to one or more predetermined criteria for real-time reporting of the web site analytics data to a publisher. As described before, each event tracking data communication can include visitor identity data corresponding to a user session, location data associated with the user/visitor, and a timestamp corresponding to the visitor action.

The real-time server of some implementations can process the aforementioned data to generate real-time analytics data for temporary storage. For instance, the real-time server can aggregate and sort the location data according to the timestamp of the visitor action and then temporarily store the aggregated and/or sorted real-time analytics data. One of ordinary skill in the art would appreciate that other criteria can be used for aggregating and sorting the real-time analytics data. In one aspect, the real-time server sends the aggregated and/or sorted real-time analytics data to the front-end tier 150 for reporting the real-time analytics data. Moreover, as used herein, temporary storage can be understood as providing volatile, quick access to data (in comparison to persistent storage) stored in a storage device such as volatile memory (e.g., random access memory).

Alternatively to the above, the front-end tier 150 in one aspect can run queries on the stored real-time analytics data to report to the publisher with low latency. For instance, the real-time server can be configured to process incoming queries from the front-end tier on the stored real-time analytics data. The real-time server can return matching real-time analytics data based on the queries to the front-end tier 150 for real-time presentation with low latency.

In some implementations, the system 100 includes the front-end tier 150, which includes at least one front-end server configured to report the real-time analytics data with low latency. As described above, the front-end server of some implementations is configured to receive real-time analytics data from the real-time server. By way of example, the front-end server can receive real-time web analytics data associated with a particular location (e.g., city, state, country, etc.) over a predetermined time period for presentation at a front-end interface (i.e., graphical user interface) to an end-user. One of ordinary skill in the art would understand that any set of real-time analytics data could be received for reporting the analytics data in a real-time manner.

Although the above description provides that system 100 includes several tiers, one of ordinary skill in the art would appreciate that in some configurations respective tiers could be combined to function as a single tier and still be within the scope of the subject technology. For instance, the above described collecting and logging tiers could be implemented as a single tier that perform a combined set of functions.

Moreover, to facilitate communication between the respective tiers as described above, the respective tiers can be configured to communication over a type of network, such as a local area network, a wide area network, or an interconnected network of networks (e.g., the Internet) and by using any sort of network/communications protocol (Transmission Control Protocol and Internet Protocol (TCP/IP), HTTP, etc.).

In addition, different configurations of the multi-tiered system can be organized in different ways. For instance, different tiers could be located in different geographical locations. Each geographical location can be associated with a respective data center that includes one or more servers associated with a particular tier. Alternatively or conjunctively, the respective servers in one particular tier could be located in one or more different geographical locations and/or data centers. This flexibility in organizing the multi-tiered system provides an advantage of increasing the scalability of the system to include servers across potentially disparate physical locations.

In the following section, respective exemplary processes for routing an event tracking data communication to a real-time server and processing the tracking data communication by the real-time server are described in further detail.

Figure 2:
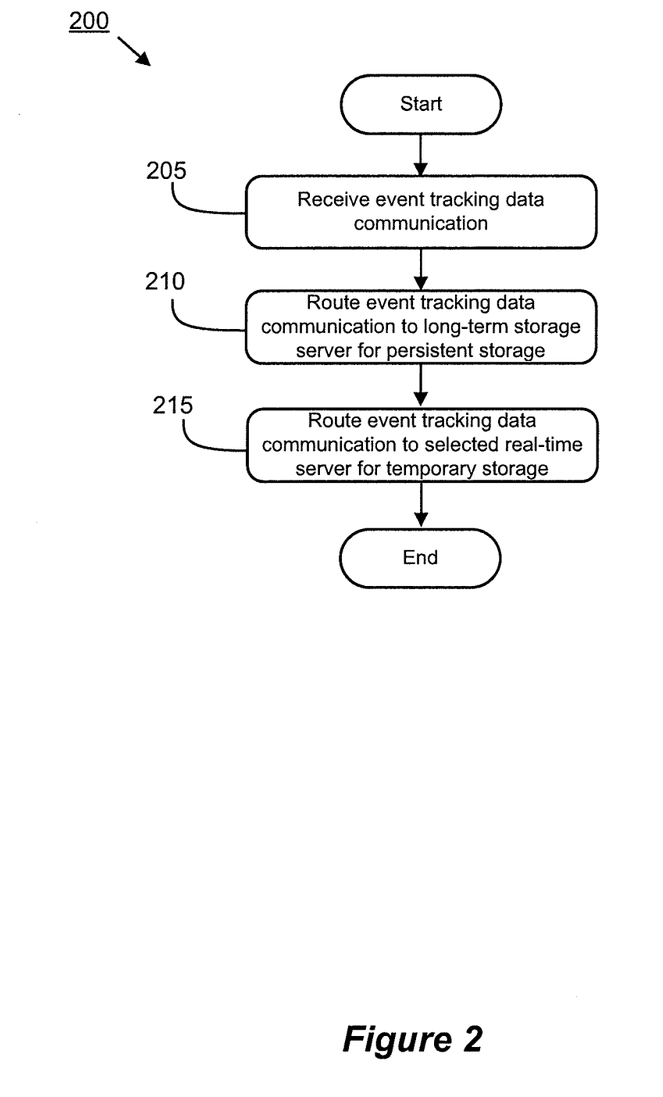
FIG. 2 conceptually illustrates an exemplary process for routing an event tracking data communication for persistent and temporary storage of some configurations.

FIG. 2 conceptually illustrates an exemplary process 200 for routing an event tracking data communication for persistent and temporary storage of some configurations. More specifically, FIG. 2 illustrates the process performed by a logging server to route event tracking data communications to a persistent tier and to a real-time analytics tier. The process 200 of FIG. 2 will be described by reference to corresponding portions of FIG. 1.

The process 200 starts when an event tracking data communication is received at 205. By reference to FIG. 1, the logging server in the logging tier 120 receives the event tracking data communication from a collecting server in the collecting tier 110. In some implementations, the logging server can receive the web site communication when pushed from the collecting server. For example, instead of the logging server utilizing a client pull technique to request an event tracking data communication, the tracking data communication is pushed as a server push from the collecting server to the logging server. Hence, the latency of receiving the event tracking data communication is decreased because the aforementioned data flow reduces the typical overhead associated with a traditional request/response communication flow.

The process 200 can then perform the task of routing the received web site to separate tiers. At 210, the event tracking data communication is routed to a long-term storage server (e.g., in the persistent tier 130 from FIG. 1) for persistent storage. Referring to FIG. 1, the logging server in the logging tier 120 routes the event tracking data communication to the long-term storage server in persistent tier 130. In some implementations, the logging server can queue several received event tracking data communications for routing the tracking data communications in a batch manner. When the logging server performs the steps in the process 200, some implementations can further verify the delivery of the event tracking data communication to the long-term storage server in order to guarantee the delivery of the communication.

The process 200 then continues to 215 to route the event tracking data communication to a selected real-time server. Referring to FIG. 1, the real-time analytics tier 140 can include several real-time servers. The logging server in the logging tier 130 can arbitrarily select a real-time server to route the event tracking data communication. By performing an arbitrary selection of the real-time server, latency in reporting real-time analytics data can be decreased because the process 200 does not rely on any particular real-time server to process the tracking data communication. The arbitrary selection of the real-time server by the process 200 also alleviates potential processing bottlenecks by impartially distributing the event tracking data communications across the real-time servers in the real-time analytics tier 140 from FIG. 1. In some configurations, the real-time server can be selected based on different criteria. For example, the logging server can select the real-time server using a randomized selection in which a particular real-time server is randomly selected from among more than one different real-time servers. In yet other configurations, the logging server can select the real-time server based on load-balancing requirements in which one or more particular computing metrics are utilized to determine the real-time server to receive the event tracking data communication.

Additionally, the process 200 at 215 can route the event tracking data communication at a greater frequency than routing the communication to the long-term storage server. For example, when the logging server receives the event tracking data communication, the logging server can queue several tracking data communications before sending them to the long-term storage server because low latency is not a factor for the aspect of the multi-tiered system dealing with persistent storage of the event tracking data. In one aspect, the logging server can immediately or in a shorter time period route the event tracking data communication to the randomly selected real-time analytics server to ensure that the requirement of low latency processing, storing and reporting of the real-time analytics data is met. After routing the event tracking data communication to the long-term storage server and the real-time server, the process 200 then ends.

Although the above description of the process 200 describes that routing to the long-term storage server occurs before routing to the real-time server, one of ordinary skill in the art can appreciate that the described order is one exemplar and some implementations could reverse the order of the previously described routing without departing from the scope of the invention. For instance, some implementations could route the event tracking data communication to the real-time server before routing the communication to the long-term storage server. In another aspect, routing the communication to the long-term storage server and the real-time server occurs in a simultaneous and/or synchronous manner.

Figure 3:
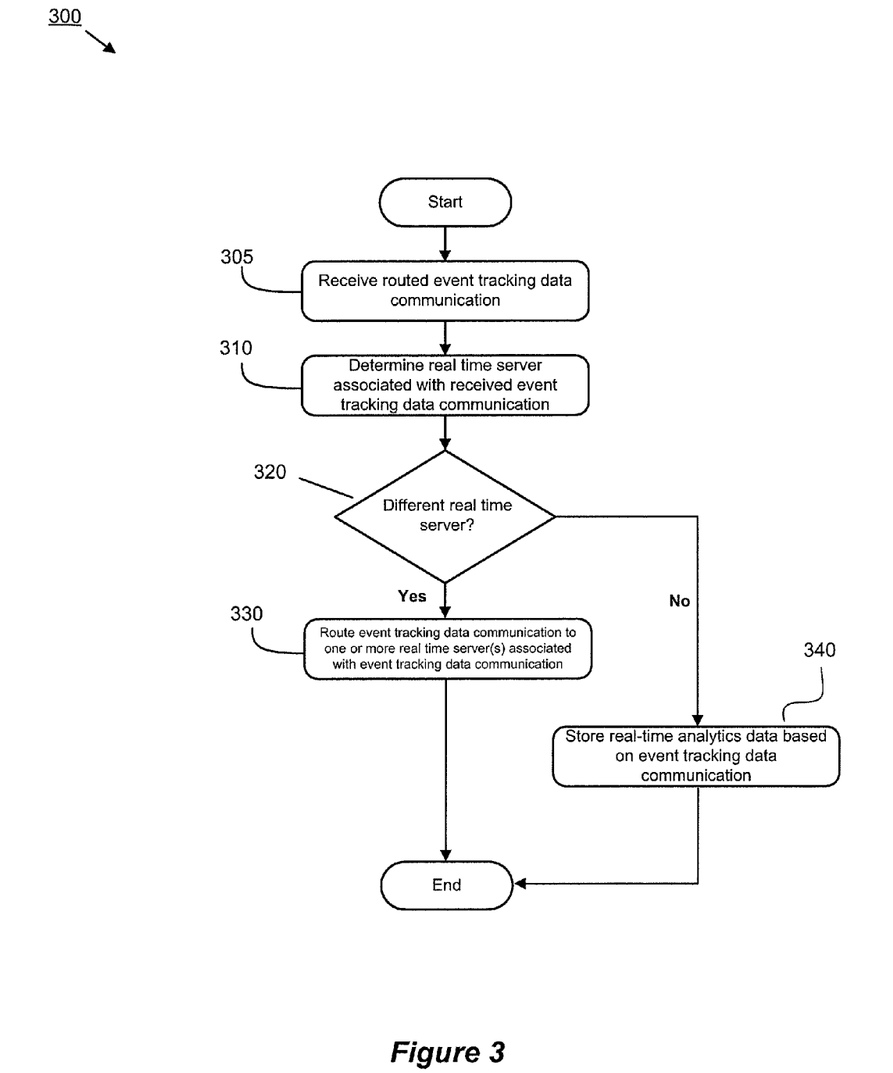
FIG. 3 conceptually illustrates an exemplary process for processing an event tracking data communication in a real-time server of some configurations.

The following discussion describes an exemplary process for processing and storing an event tracking data communication received by an arbitrarily selected real-time server. In some configurations, after the event tracking data communication is routed to the arbitrarily selected real-time server as described above in FIG. 2, the process illustrated in FIG. 3 is performed by the real-time server. More specifically, FIG. 3 conceptually illustrates an exemplary process 300 for processing an event tracking data communication in a real-time server.

The process 300 begins when a routed event tracking data communication is received at 305 in a selected real-time server. For instance, the real-time server can receive the event tracking data communication when the communication is pushed from the logging server to the real-time server. As similarly discussed above in connection with FIG. 2, the logging server can employ a push technique to push event tracking data communications to the arbitrarily selected real-time server. In other words, by pushing the event tracking data communication, the logging server initiates a communication flow without requiring an initial request from the recipient (i.e., the arbitrarily selected real-time server). Thus, an associated overhead of a typical request/request communication flow can be eliminated in the multi-tiered system. As a result, latency is reduced in the system for processing and reporting real-time analytics data.

At 310, the process 300 determines the real-time server(s) associated with the event tracking data communication. In some implementations, a real-time server(s) can be associated with a web site of a particular publisher. For instance, the real-time server can consult a table, list or other suitable data structure that indicates one or more real-time servers that are associated with the publisher's web site. The associated one or more real-time servers therefore can be considered an "owner" of any event tracking data communication for that publisher's web site. In practical terms, when acting as the owner, the associated real-time server is required to process each event tracking data communication for that publisher's web site. Based on the determination at 310, the process 300 can decide at 320 whether a different real-time server is associated with the received event tracking data communication.

In an instance in which the process 300 determines at 320 that the real-time server is not associated with the event tracking data communication, the process 300 continues to 330. At 330, the process 300 routes the event tracking data communication to one or more real-time servers associated with the event tracking data communication based on the determination at 310. Referring to FIG. 1, the real-time server can route the event tracking data communication to the associated one or more real-time servers in the real-time analytics tier 140. The process 300 then ends.

Alternatively, in an instance in which the process 300 determines at 320 that the real-time server is associated with the event tracking data communication, the process 300 continues to 340 to temporarily store real-time analytics data based on the event tracking data communication. A more detailed description of exemplars of the real-time analytics data will be discussed below in connection with FIG. 4 below. In some implementations, the process 300 temporarily stores the real-time analytics data in non-persistent storage (e.g., volatile memory, RAM, etc.). After storing the event tracking data communication, the process 300 then ends.

Although the above description describes that the process 300 determines an associated owner of the event tracking data communication at 320, one of ordinary skill in the art can appreciate that in some implementations this step is not performed (i.e., process 300 foregoes 310-330) and the process 300 immediately proceeds to 340 to store the event tracking data communication. In such implementations, the real-time server that receives the communication assumes ownership of the received communication.

The following section describes exemplar attributes and data structures of the real-time analytics data. An associated real-time server can temporarily store such attributes and data structures illustrated in FIG. 4 for reporting real-time analytics data.

Figure 4:
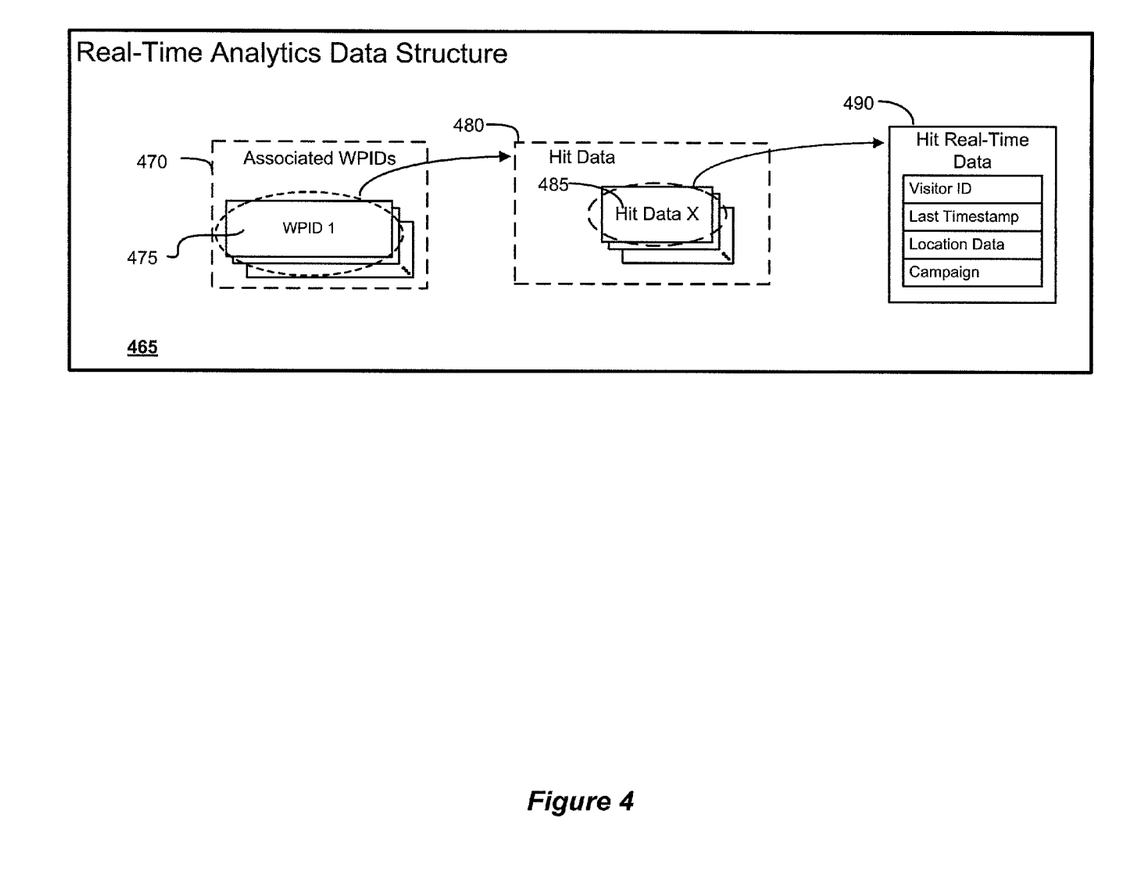
FIG. 4 conceptually illustrates various attributes and data structures that are included in some configurations of the multi-tiered real-time analytics system.

FIG. 4 conceptually illustrates different attributes and data structures that are included in some configurations of the multi-tiered real-time analytics system. More specifically, FIG. 4 depicts exemplar attributes and data structures of a real-time analytics data structure 465 that are based on event tracking data communications. For instance, an event tracking data communication can include data for identifying a user session of a visitor, a location of the visitor, and other real-time analytics attributes. A real-time server can temporarily store the real-time analytics attributes and data structures shown in FIG. 4 based on the aforementioned data included in the event tracking data communication.

In some implementations, the real-time analytics data structure 465 can be understood as a container that is a collection of the various attributes and data structures based on one or more event tracking data communication(s). As shown in FIG. 4, the real-time analytics data structure 465 includes an associated web property identity (WPID) data structure 470, associated WPID attribute 475, hit data structure 480, hit data element 485 and hit real-time data attributes 490. Although these attributes and data structures are represented as included in a single data structure, some implementations can store each of the attributes and data structures in separate data structures that include any combination of data attributes. The aforementioned attributes and data structures are described in further detail as set forth below.

As illustrated, the associated web property identity (WPID) data structure 470 includes one or more associated WPID attributes. Each associated WPID attribute can represent a publisher of a web site which is associated with the real-time server. As shown, the associated WPID attribute 475 corresponds with a publisher with a "WPID 1" that represents a unique string ID for the publisher. One of ordinary skill in the art would understand that the unique string ID could be formed from any combination of alphanumeric characters and/or symbols.

In some implementations, each associated WPID attribute can include a reference to the hit data structure 480. The hit data structure 480 includes attributes for each event tracking data communication for the publisher. As shown, the hit data structure 480 includes hit data element 485 corresponding to a particular event tracking data communication "X" for the publisher corresponding with associated WPID attribute 475. The hit data element 485 is shown in more detail in breakout section 490.

As further shown in FIG. 4, the hit data element 485 can include the real-time data attributes 490 corresponding to a visitor ID, a last timestamp, location data and campaign data. The visitor ID attribute represents a unique ID string associated with a unique visitor session. The visitor ID attribute does not necessarily identify a particular end-user but instead corresponds with a particular user session on the publisher's web site. For example, the visitor ID can be a randomized identifier that is determined based on different information such as the visitor's web browser or client, the timestamp associated with the visitor's session, and/or the visitor's hostname, etc. Additionally, the location data does not identify the visitor's personal address, but is related to a geographical location (e.g., city) that can be determined based on the IP address assigned to the visitor (e.g., by an Internet service provider).

Next, the last timestamp attribute of the real-time data attributes 490 represents the most recent timestamp in which the unique visitor visited the publisher's web site. A timestamp in some implementations is a sequence of alphanumeric characters that denotes the date and/or time in which a particular event occurred. The location data attribute represents the geographical location of the unique visitor, such as a specified city, state, county, country, zip code, global positioning system coordinates, and/or geographical coordinates (e.g., latitude, longitude, elevation), etc. Lastly, the campaign attribute identifies a particular marketing campaign corresponding with a set of associated marketing activities. For instance, the associated marketing activities can respectively correspond to a set of web pages on the publisher's web site. Any visitor activity/action related to the set of web pages on the publisher's web page can then be associated with the marketing campaign. In this manner, the campaign attribute can identify the marketing campaign associated with the visitor action.

Different implementations can implement and organize the above described attributes and data structures in different ways. For instance, the real-time analytics data structure 465 of some configurations can be implemented as a collection of tree data structures, otherwise known as a "forest." In this exemplar, a root node of a particular tree corresponds with a particular WPID (i.e., publisher identity) and each direct child of the root node can represent multiple visitor nodes that are associated with respective visitors to the publisher's web site. For each visitor node, visitor specific attributes are stored. Each visitor node can have multiple direct child nodes that represent the associated visitor's actions based on a timestamp. The timestamp of the last action for the associated visitor can also be stored with the parent associated visitor node described above. Alternatively or conjunctively, certain visitor attributes can be implemented as discrete nodes, such as a node including a city identifier with respective direct child nodes corresponding to a city name and geographical coordinates (e.g., latitude, longitude, etc.).

The following section describes a software architecture of a real-time server that can implement the above described processes and data structures as a computer program running on a particular machine, such as a computer, or stored as instructions in a computer readable medium.

Figure 5:
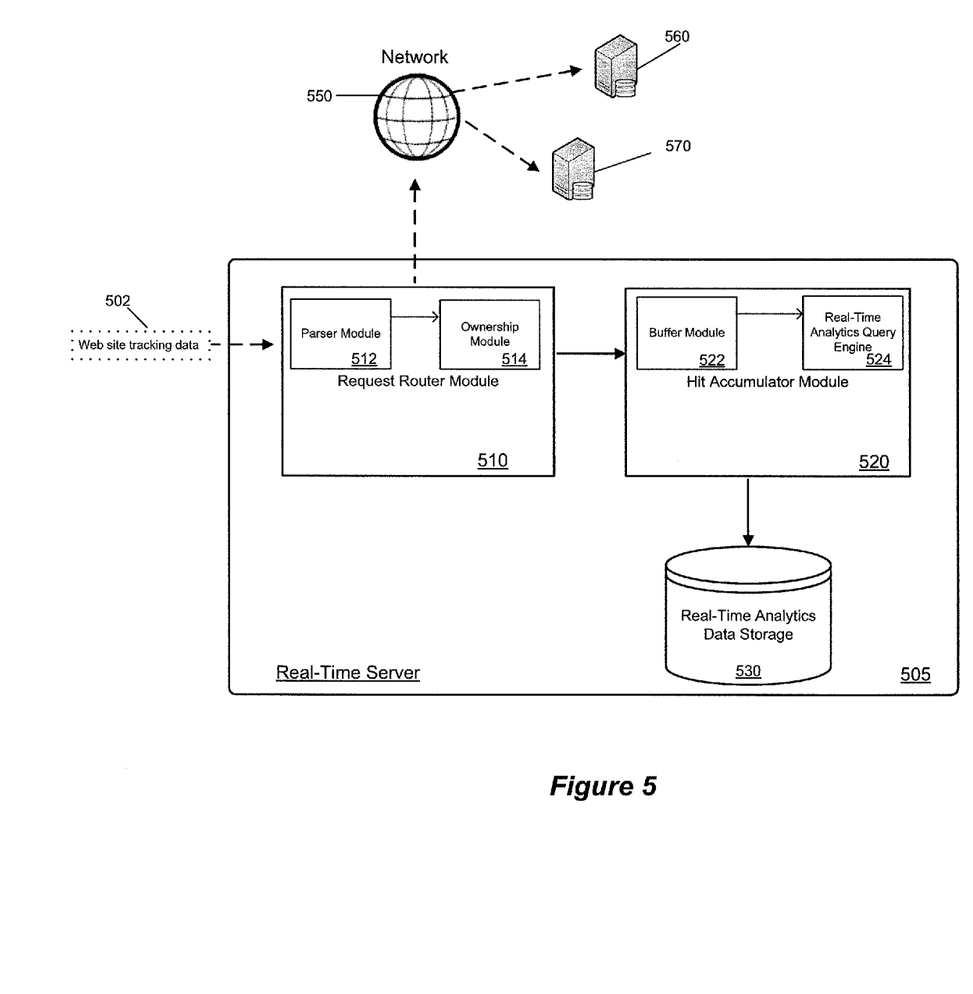
FIG. 5 conceptually illustrates an exemplary software architecture of an real-time server of some configurations.

FIG. 5 conceptually illustrates an exemplary software architecture of a real-time server 505 of some configurations. In particular, FIG. 5 shows various modules and components of the real-time server 505 for implementing the above described process in FIG. 2 and data structures in FIG. 4. In some configurations, the software architecture of the real-time server is part of a server-based implementation running a particular machine connected to a network.

As illustrated in FIG. 5, the real-time server 505 can include a request router module 510 for parsing and routing web site tracking data, a hit accumulator module 520 for buffering and querying real-time analytics data, and a real-time analytics data storage 530 for temporarily storing real-time analytics data. The real-time analytics data storage 530 in some implementations is a type of volatile and non-persistent storage (e.g., RAM). The operation of the aforementioned modules of the real-time server 505 are discussed in the following description.

The real-time server 505 can receive web site tracking data 502 in a request router module 510. The web site tracking data 502 can be in the form of an event tracking data communication that is received over a network 550. As shown, the request router module 510 includes a parser module 512 and an ownership module 514. The parser module 512 of some implementations can parse the web site tracking data to extract real-time analytics data and to subsequently transmit the real-time analytics data to the ownership module 514. The ownership module 514 determines a set of associated real-time servers that are owners of the web site tracking data corresponding with a publisher's web site. In an instance where the ownership module 514 determines that the web site tracking data 502 is not associated with the real-time server 505, the request router module 510 can route the web site tracking data 502 over the network 550 to other associated real-time servers. As shown in FIG. 5, additional real-time servers 560 and 570 are connected to the network 550. Alternatively, in the event that the ownership module 514 determines that the real-time server 505 is associated with the web site tracking data 502, the request router module 510 routes (i.e., sends) the web site tracking data to the hit accumulator module 520 for further processing and temporary storage.

The hit accumulator module 520 receives the web site tracking data routed from the request router module 510. In some implementations, the hit accumulator module 520 includes a buffer module 522 as shown for queuing/aggregating the web site tracking data. The buffer module 522 can be implemented in different ways. For instance, the buffer module 522 could utilize a first-in first-out (FIFO) scheme in which the earliest received web site tracking data is transferred out before later received data. In other instances, the buffer module 522 could employ a last-in first-out (LIFO) scheme that is analogous to a stack in which the later received data is transferred out before earlier received data.

As shown in FIG. 5, the buffer module 522 then sends web site tracking data to a real-time analytics query engine 524 in the hit accumulator module 520. The real-time analytics query engine 524 of some configurations performs query processing and data management of the real-time analytics data storage 530. By way of example, the real-time analytics query engine 524 can perform write and/or update operations to temporarily store the web site tracking data to the real-time analytics data storage 530. Given the requirements of low latency involved with reporting real-time analytics data, the real-time analytics data storage 530 can be implemented to provide fast access to stored real-time analytics data. In particular, the real-time analytics data storage 530 can be implemented as fast non-persistent/volatile memory that is periodically flushed and/or overwritten with more recent web site tracking data. In this manner, the overhead of managing the data in the real-time analytics data storage 530 is reduced because longevity of the data is not a primary objective.

In some implementations, the hit accumulator module 520 can execute queries for sorting and/or aggregating the received web site tracking data for temporary storage in the real-time analytics data storage 530. For instance, referring back to FIG. 1, a real-time server from the real-time analytics tier 140 can aggregate and sort the real-time analytics data according to one or more predetermined queries for temporary storage and then send the aggregated and/or sorted real-time analytics data to the front-end tier 150 for reporting the real-time analytics data. As shown in FIG. 5, the real-time analytics query engine 524 of hit accumulator module 520 can execute the queries in order to sort and/or aggregate the received web site tracking data before temporarily storing the real-time analytics data in the real-time analytics data storage 530. The real-time server 505 can then send the stored aggregated and/or sorted real-time analytics data to a front-end server for reporting and/or presenting real-time analytics data to an end-user.

The following section describes an exemplary system that implements aspects of the above described invention.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software inventions can be implemented as sub-parts of a larger program while remaining distinct software inventions. In some implementations, multiple software inventions can also be implemented as separate programs. Finally, any combination of separate programs that together implement a software invention described here is within the scope of the invention. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 6:
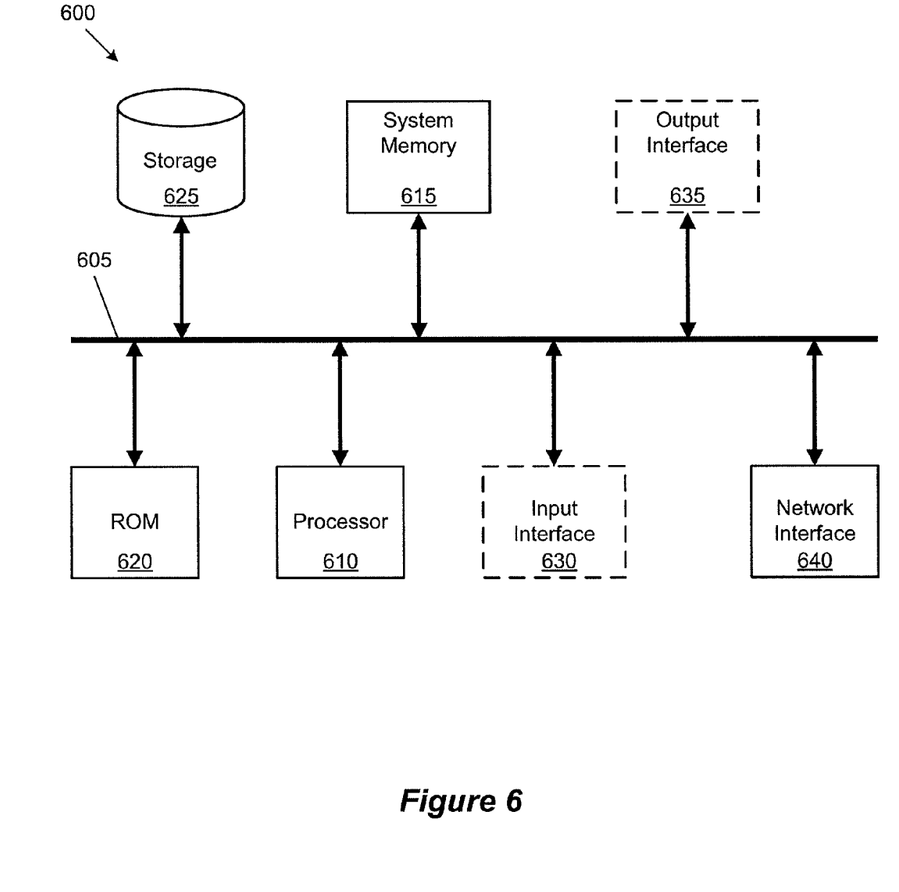
FIG. 6 conceptually illustrates an exemplary system in which some configurations are implemented.

FIG. 6 conceptually illustrates a system 600 with which some implementations of the subject technology may be implemented. The system 600 can be a computer, phone, PDA, or any other sort of electronic device. Such a system includes various types of computer readable media and interfaces for various other types of computer readable media. The system 600 includes a bus 605, processing unit(s) 610, a system memory 615, a read-only memory 620, a storage device 625, an optional input interface 630, an optional output interface 635, and a network interface 640.

The bus 605 collectively represents all system, peripheral, and chipset buses that communicatively connect the numerous internal devices of the system 600. For instance, the bus 605 communicatively connects the processing unit(s) 610 with the read-only memory 620, the system memory 615, and the storage device 625.

From these various memory units, the processing unit(s) 610 retrieves instructions to execute and data to process in order to execute the processes of the invention. The processing unit(s) can be a single processor or a multi-core processor in different implementations.

The read-only-memory (ROM) 620 stores static data and instructions that are needed by the processing unit(s) 610 and other modules of the system 600. The storage device 625, on the other hand, is a read-and-write memory device. This device is a non-volatile memory unit that stores instructions and data even when the system 600 is off. Some implementations of the invention use a mass-storage device (such as a magnetic or optical disk and its corresponding disk drive) as the storage device 625.

Other implementations use a removable storage device (such as a flash drive, a floppy disk, and its corresponding disk drive) as the storage device 625. Like the storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the invention's processes are stored in the system memory 615, the storage device 625, and/or the read-only memory 620. For example, the various memory units include instructions for processing multimedia items in accordance with some implementations. From these various memory units, the processing unit(s) 610 retrieves instructions to execute and data to process in order to execute the processes of some implementations.

The bus 605 also connects to the optional input and output interfaces 630 and 635. The optional input interface 630 enables the user to communicate information and select commands to the system. The optional input interface 630 can interface with alphanumeric keyboards and pointing devices (also called "cursor control devices"). The optional output interface 635 can provide display images generated by the system 600. The optional output interface 635 can interface with printers and display devices, such as cathode ray tubes (CRT) or liquid crystal displays (LCD). Some implementations can interface with devices such as a touchscreen that functions as both input and output devices.

Finally, as shown in FIG. 6, bus 605 also couples system 600 to a network interface 640 through a network adapter (not shown). In this manner, the computer can be a part of a network of computers (such as a local area network ("LAN"), a wide area network ("WAN"), or an Intranet, or an interconnected network of networks, such as the Internet. Any or all components of system 600 can be used in conjunction with the invention.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A multi-tiered system for receiving and reporting web site traffic data with low latency, the system comprising:
    a collecting server configured to receive and forward an event tracking data communication, wherein the event tracking data communication includes event tracking data for tracking an activity associated with a source of the event tracking data communication;
    a logging server configured to receive the event tracking data communication from the collecting server; and
    a real-time server configured to receive one or more event tracking data communications for temporary storage,
    wherein the logging server is further configured to route the received event tracking data communication to both a long-term storage server for persistent storage and the real-time server for temporary storage, and
    wherein the real-time server is configured to process the event tracking data for reporting to a publisher with low latency, determine whether the event tracking data can be processed within a specified period of time to meet a real-time constraint, and discard the event tracking data in response to determining that the event tracking data will fail to be processed within the specified period of time,
    wherein, for a same predetermined time period, the logging server routes one or more event tracking data communications to the real-time server at a greater frequency than routing one or more event tracking data communications to the long-term storage server, and
    for the same predetermined time period, an aggregate number of event tracking data communications routed to the long-term storage server is greater than an aggregate number of event tracking data communications routed to the real-time server.

2. The system of claim 1, wherein the event tracking data includes web site traffic data included in a Hypertext Transfer Protocol (HTTP) request associated with a web site.

3. The system of claim 1, further comprising a front-end server configured to present the event tracking data with low latency.

4. The system of claim 1, wherein the logging server is further configured to aggregate a respective plurality of event tracking data communications from a respective plurality of associated web sites.

5. The system of claim 1, wherein the logging server is further configured to verify routing to the long-term storage server to guarantee delivery of the event tracking data communication.

6. The system of claim 1, wherein the received event tracking data communication is replicated across a second long-term storage server.

7. The system of claim 1, wherein the event tracking data communication comprises a Hypertext Transfer Protocol (HTTP) request.

8. The system of claim 7, wherein the HTTP request includes randomized visitor identity data and geographical location data associated with the visitor.

9. The system of claim 1, wherein the real-time server is configured to determine an associated owner of the event tracking data communication.

10. The system of claim 1, wherein the real-time server stores real-time analytics data based on the event tracking data communication.

11. A machine-implemented method for receiving and reporting web site traffic data with low latency, the method comprising:
    receiving an event tracking data communication, wherein the event tracking data communication includes event tracking data for tracking an activity associated with a source of the event tracking data communication;
    routing the event tracking data communication to a long-term storage server for persistent storage;
    selecting a real-time server for routing the event tracking data communication; and
    routing the event tracking data communication to the selected real-time server for temporary storage, wherein the selected real-time server is configured to process the event tracking data for reporting to a publisher, determine whether the event tracking data can be processed within a specified period of time to meet a real-time constraint, and discard the event tracking data in response to determining that the event tracking data will fail to be processed within the specified period of time,
    wherein, for a same predetermined time period, routing one or more event tracking data communications to the selected real-time server occurs at a greater frequency than routing one or more event tracking data communications to the long-term storage server, and
    for the same predetermined time period, an aggregate number of event tracking data communications routed to the long-term storage server is greater than an aggregate number of event tracking data communications routed to the selected real-time server.

12. The method of claim 11, wherein the event tracking data includes web site traffic data included in a Hypertext Transfer Protocol (HTTP) request associated with a web site.

13. The method of claim 11, wherein selecting the real-time server comprises an arbitrary selection among a plurality of real-time servers.

14. The method of claim 11, wherein the routing the event tracking data communication to the long-term storage server further comprises verifying the routing to guarantee delivery of the event tracking data communication.

15. A machine-implemented method for receiving and storing real-time web site traffic data with low latency at a real-time server, the method comprising:
    receiving, at a first real-time server, an event tracking data communication, wherein the event tracking data communication includes event tracking data for tracking an activity associated with a source of the event tracking data communication;
    determining, at the first real-time server, at least one real-time server associated with the received event tracking data communication, wherein the at least one real-time server is configured to process the event tracking data within a specified period of time to meet a real-time constraint for processing the event tracking data, determine whether the event tracking data can be processed within the specified period of time to meet a real-time constraint, and discard the event tracking data in response to determining that the event tracking data will fail to be processed within the specified period of time;

storing, at the first real-time server, real-time analytics data based on the received event tracking data communication in response to determining that the first real-time server is associated with the received event tracking data communication; and routing the event tracking data communication to a second real-time server in response to determining that the second real-time server, instead of the first real-time server, is associated with the received event tracking data communication, wherein the first and second real-time servers are both included in a group of real-time servers, wherein, for a same predetermined time period, routing one or more event tracking data communications to the second real-time server occurs at a greater frequency than routing one or more event tracking data communications to a long-term storage server, and for the same predetermined time period, an aggregate number of event tracking data communications routed to the long-term storage server is greater than an aggregate number of event tracking data communications routed to the second real-time server.

16. The method of claim 15, wherein the event tracking data includes web site traffic data included in a Hypertext Transfer Protocol (HTTP) request associated with a web site.

17. The method of claim 15, wherein the event tracking data communication is received from a logging server based on a random selection.

18. The method of claim 15, wherein storing the real-time analytics data comprises storing to non-persistent storage.

19. The method of claim 18, wherein the non-persistent storage comprises volatile memory.

20. A non-transitory machine-readable medium comprising instructions stored therein, which when executed by a machine, cause the machine to perform operations comprising:

receiving one or more event tracking data communications, wherein the event tracking data communication includes event tracking data for tracking an activity associated with a source of the event tracking data communication;

routing the one or more event tracking data communications to a long-term storage server for persistent storage, wherein the one or more event tracking data communications are stored in non-volatile storage on the long-term storage server;

selecting a real-time server among a plurality of real-time servers for routing the one or more event tracking data communications, wherein the real-time server is arbitrarily selected; and routing the one or more event tracking data communications to the selected real-time server for temporary storage, wherein the selected real-time server is configured to process the event tracking data for reporting to a publisher, determine whether the event tracking data can be processed within a specified period of time to meet a real-time constraint, and discard the event tracking data in response to determining that the event tracking data will fail to be processed within the specified period of time, wherein, for a same predetermined time period, routing one or more event tracking data communications to the selected real-time server occurs at a greater frequency than routing one or more event tracking data communications to the long-term storage server, and for the same predetermined time period, an aggregate number of event tracking data communications routed to the long-term storage server is greater than an aggregate number of event tracking data communications routed to the selected real-time server.

21. The non-transitory machine-readable medium of claim 20, wherein the event tracking data includes web site traffic data included in a Hypertext Transfer Protocol (HTTP) request associated with a web site.

22. The non-transitory machine-readable medium of claim 20, wherein the one or more event tracking data communications are received from a collecting server.

* * * * *